(12) United States Patent
Mitsue et al.

(10) Patent No.: US 10,964,131 B2
(45) Date of Patent: Mar. 30, 2021

(54) STATE MONITORING DEVICE FOR PLATE SPRING OF RAILCAR BOGIE (71) Applicant: KAWASAKI JUKOGYO KABUSHIKI KAISHA, Kobe (JP)

(72) Inventors: Masayuki Mitsue, Akashi (JP);
Teruhisa Nakaoka, Akashi (JP);
Tomohei Kobayashi, Akashi (JP);
Katsuyuki Kawashima, Akashi (JP);
Takehiro Nishimura, Kobe (JP);
Yousuke Tsumura, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 660 days.

(21) Appl. No.: 15/548,798

(22) PCT Filed: Jan. 25, 2016

(86) PCT No.: PCT/JP2016/000343
§ 371 (c)(1),
(2) Date: Aug. 4, 2017

(87) PCT Pub. No.: WO2016/125448
PCT Pub. Date: Aug. 11, 2016

(65) Prior Publication Data
US 2018/0033222 A1 Feb. 1, 2018

(30) Foreign Application Priority Data

Feb. 4, 2015 (JP) .............................. JP2015-020124

(51) Int. Cl.
*G07C 5/08* (2006.01)
*B61F 5/30* (2006.01)
(Continued)

(52) U.S. Cl.
CPC .............. *G07C 5/0808* (2013.01); *B61F 5/30* (2013.01); *B61F 5/52* (2013.01); *B61F 15/20* (2013.01); *G01N 27/20* (2013.01)

(58) Field of Classification Search
CPC .... G01N 27/20; G01N 2223/615; B61F 5/30; B61F 5/52; B61F 15/20; G07C 5/0808
See application file for complete search history.

(56) References Cited

U.S. PATENT DOCUMENTS 6,305,297 B1 * 10/2001 Landrot .................. B61F 5/302
105/157.1
6,338,300 B1 * 1/2002 Landrot .................. B61F 5/305
105/182.1

(Continued)

FOREIGN PATENT DOCUMENTS

CN 102753961 A 10/2012
JP H06-047745 U 6/1994
(Continued)

OTHER PUBLICATIONS

Apr. 19, 2016 International Search Report issued in Patent Application No. PCT/JP2016/000343.
(Continued)

*Primary Examiner* — Huy Q Phan
*Assistant Examiner* — Dustin R Dickinson
(74) *Attorney, Agent, or Firm* — Oliff PLC (57) ABSTRACT

A state monitoring device for a plate spring mounted on a railcar bogie is configured to monitor a state of the plate spring, the plate spring including fiber-reinforced resin containing electrically conductive reinforced fibers containing reinforced fibers extending in a longitudinal direction of the plate spring. The state monitoring device includes: an electrode pair provided at both width direction side end surfaces of the plate spring and sandwiching the plate spring, a width direction of the plate spring being perpendicular to the
(Continued)

longitudinal direction of the plate spring and a thickness direction of the plate spring; and a measuring unit electrically connected to the electrode pair and configured to measure an electrical characteristic of the plate spring.

9 Claims, 4 Drawing Sheets

(51) Int. Cl.
*B61F 5/52* (2006.01)
*B61F 15/20* (2006.01)
*G01N 27/20* (2006.01)

(56) References Cited

U.S. PATENT DOCUMENTS

| | | | | |
|---|---|---|---|---|
| 6,422,540 | B1* | 7/2002 | Pfletschinger | F16F 1/368 267/47 |
| 2007/0166831 | A1* | 7/2007 | Watkins, Jr. | G01N 27/20 436/149 |
| 2011/0089958 | A1 | 4/2011 | Malecki et al. | |
| 2015/0185128 | A1* | 7/2015 | Chang | G01N 3/066 702/35 |
| 2016/0084789 | A1* | 3/2016 | Slipher | G01N 27/041 324/700 |

FOREIGN PATENT DOCUMENTS

| | | |
|---|---|---|
| JP | H06-47749 U | 6/1994 |
| JP | 2001-318070 A | 11/2001 |
| JP | 2002-131265 A | 5/2002 |
| JP | 2009-006497 A | 1/2009 |
| JP | 5438796 B2 | 3/2014 |

OTHER PUBLICATIONS

Aug. 8, 2017 International Preliminary Report on Patentability issued in Patent Application No. PCT/JP2016/000343.

* cited by examiner

STATE MONITORING DEVICE FOR PLATE SPRING OF RAILCAR BOGIE

TECHNICAL FIELD

The present invention relates to a state monitoring device for a plate spring of a railcar bogie.

BACKGROUND ART

As disclosed in PTL 1, proposed is a railcar bogie from which side sills are omitted in such a manner that: each of plate springs extends between front and rear axle boxes; and longitudinal direction middle portions of the plate springs support a cross beam. To be specific, in this bogie, the plate spring achieves the function of a suspension and the function of a conventional side sill. To reduce the weight of the bogie, the plate springs are formed by using fiber-reinforced resin.

While the bogie is traveling, loads are repeatedly applied to the plate springs. Therefore, regarding the plate springs that have been used for a long period of time, attention to strength deterioration by fatigue is necessary. Here, realizing simple monitoring of the state of the plate spring itself is useful for an improvement of maintenance efficiency of the bogie. For example, PTL 2 discloses a technique in which: a plurality of electrodes are arranged at predetermined intervals on one of main surfaces of a composite material made of CFRP; and delamination of the composite material is detected from a change in electrical resistance measured based on current flowing between the electrodes. Further, PTL 3 discloses a technique in which: a pair of connectors are fixed to both longitudinal direction ends of a plate spring made of CFRP; and cutting of carbon fibers having electrical conductivity is detected from a change in electrical resistance measured based on current flowing between the connectors.

CITATION LIST

Patent Literature

PTL 1: Japanese Patent No. 5438796
PTL 2: Japanese Laid-Open Patent Application Publication No. 2001-318070
PTL 3: Japanese Laid-Open Utility Model Application Publication No. 6-47745

SUMMARY OF INVENTION

Technical Problem

However, in PTL 2, since the electrodes are arranged on one of the main surfaces of the composite material, most current flows through portions in the vicinity of the one main surfaces of the composite material, and current does not adequately flow through a thickness direction middle portion of the composite material or portions in the vicinity of the other main surface of the composite material. Therefore, it is difficult to detect break or delamination at portions away in the thickness direction from the surface of the composite material on which surface the electrodes are arranged. Further, if the technology of PTL 2 is applied to a plate spring of a bogie, the electrodes are provided on the main surface located away from a neutral axis of a thickness-direction center of the plate spring. Therefore, large compressive distortion or tensile distortion repeatedly occurs at the electrodes by bending motions of the plate spring. Thus, the electrodes tend to be damaged.

Further, in PTL 3, a pair of connectors are fixed to both longitudinal direction ends of the plate spring. Therefore, although it is possible to detect the cutting of the electrically conductive fibers in the plate spring, it is impossible to specify a position where the cutting has occurred. In addition, in PTL 3, the electrically conductive fibers continuously extend in the longitudinal direction of the plate spring, and a pair of connectors are fixed to both longitudinal direction ends of the plate spring. Therefore, it is possible to detect the change in the electrical resistance, the change being caused by the cutting of the electrically conductive fibers. However, if delamination between fiber layers occurs without the occurrence of the cutting of the fibers, the change in the electrical resistance between the connectors is small, so that it is difficult to detect such delamination.

An object of the present invention is to improve detection accuracy of break and delamination of a plate spring mounted on a railcar bogie and made of fiber-reinforced resin.

Solution to Problem

A state monitoring device for a plate spring of a railcar bogie according to one aspect of the present invention is configured to monitor a state of the plate spring, the plate spring including fiber-reinforced resin containing electrically conductive reinforced fibers containing reinforced fibers extending in a longitudinal direction of the plate spring, the state monitoring device including: an electrode pair provided at both width direction side end surfaces of the plate spring and sandwiching the plate spring, a width direction of the plate spring being perpendicular to the longitudinal direction of the plate spring and a thickness direction of the plate spring; and a measuring unit electrically connected to the electrode pair and configured to measure an electrical characteristic of the plate spring.

According to the above configuration, since the electrode pair is provided on both width direction side end surfaces of the plate spring, break and delamination generated even at a portion of the plate spring which portion is away from a main surface of the plate spring in the thickness direction can be detected highly accurately. Further, in the configuration in which electrically conductive reinforced fibers extend in the longitudinal direction of the plate spring, current flows through an electrically conductive path, formed by contact of adjacent fibers, at the electrode pair provided at the width direction side end surfaces of the plate spring. Therefore, the delamination that is separation of the adjacent fibers can be detected highly accurately. Further, a state change portion of the plate spring in the longitudinal direction can be specified more easily than a case where the electrode pair is provided on longitudinal direction end surfaces of the plate spring. Furthermore, a distance from a neutral axis of the plate spring to the electrode pair in the thickness direction is shorter than that in a case where the electrode pair is arranged on one of main surfaces of the plate spring. Therefore, distortion of the electrode pair by the compression or tension generated by bending of the plate spring decreases, and the electrode pair is prevented from being damaged.

Advantageous Effects of Invention

The present invention can improve detection accuracy of break and delamination in a plate spring mounted on a railcar bogie and made of fiber-reinforced resin.

DESCRIPTION OF EMBODIMENTS

Hereinafter, an embodiment will be explained in reference to the drawings. In the following explanations, a direction in which a railcar travels and in which a carbody extends is defined as a car longitudinal direction, and a crosswise direction perpendicular to the car longitudinal direction is defined as a car width direction. The car longitudinal direction is also referred to as a forward/rearward direction, and the car width direction is also referred to as a leftward/rightward direction. To be specific, the railcar can travel in both directions along the car longitudinal direction, but if the railcar travels in one direction, this traveling direction may be referred to as a forward direction, and a direction opposite to the traveling direction may be referred to as a rearward direction.

Figure 1:
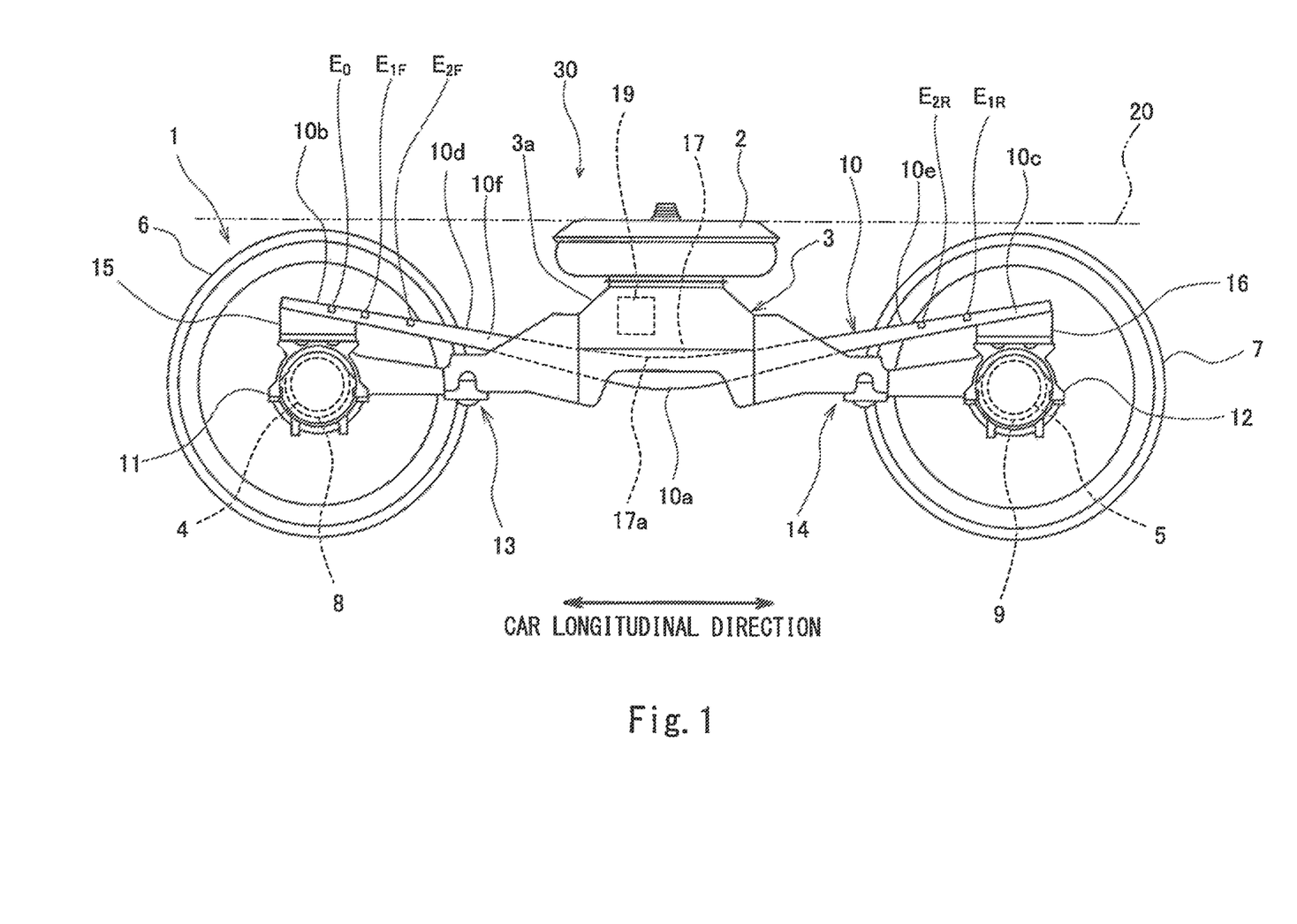
FIG. 1 is a side view of a railcar bogie including a state monitoring device for a plate spring according to an embodiment.

FIG. 1 is a side view of a railcar bogie 1 including a state monitoring device 30 for a plate spring 10 according to the embodiment. As shown in FIG. 1, the railcar bogie 1 includes a bogie frame 3 supporting a carbody 20 through air springs 2 that are secondary suspensions. The bogie frame 3 includes a cross beam 3a extending in the car width direction that is the leftward/rightward direction but does not include side sills extending from both respective car width direction end portions of the cross beam 3a in the car longitudinal direction that is the forward/rearward direction. The air springs 2 are provided on an upper surface of the cross beam 3a. A pair of front and rear axles 4 and 5 extending in the car width direction are arranged at front and rear sides of the cross beam 3a, respectively. Wheels 6 are fixed to both respective car width direction sides of the axle 4, and wheels 7 are fixed to both respective car width direction sides of the axle 5.

Bearings 8 rotatably supporting the axle 4 are provided at both respective car width direction end portions of the axle 4 so as to be located outside the respective wheels 6 in the car width direction, and the bearings 8 are accommodated in respective axle boxes 11. Similarly, bearings 9 rotatably supporting the axle 5 are provided at both respective car width direction end portions of the axle 5 so as to be located outside the respective wheels 7 in the car width direction, and the bearings 9 are accommodated in respective axle boxes 12. Each of the car width direction end portions of the cross beam 3a is coupled to the axle box 11 by an axle beam type coupling mechanism 13 and also coupled to the axle box 12 by an axle beam type coupling mechanism 14. Each of the plate springs 10 extending in the car longitudinal direction is provided between the cross beam 3a and the axle box 11 and between the cross beam 3a and the axle box 12. Longitudinal direction middle portions 10a of the plate springs 10 elastically support the respective car width direction end portions of the cross beam 3a from below. A longitudinal direction end portion 10b of the plate spring 10 is supported by the axle box 11, and a longitudinal direction end portion 10c of the plate spring 10 is supported by the axle box 12. To be specific, the plate spring 10 achieves the function of a primary suspension and the function of a conventional side sill.

Pressing members 17 each having a circular-arc lower surface 17a are provided at respective lower portions of the car width direction end portions of the cross beam 3a. Each of the pressing members 17 is placed on the middle portion 10a of the plate spring 10 from above and contacts the middle portion 10a so as to be separable from the middle portion 10a. To be specific, the pressing member 17 contacts an upper surface of the plate spring 10 and presses the upper surface from above by a downward load, applied from the cross beam 3a by gravity, so as not to fix the plate spring 10 in an upward/downward direction relative to the pressing member 17. Further, supporting members 15 and 16 are attached to upper end portions of the axle boxes 11 and 12, respectively. The end portion 10b of the plate spring 10 is supported by the axle box 11 from below through the supporting member 15, and the end portion 10c of the plate spring 10 is supported by the axle box 12 from below through the supporting member 16. Upper surfaces of the supporting members 15 and 16 are inclined toward a middle side in the car longitudinal direction. The end portion 10b of the plate spring 10 is placed on the supporting member 15 from above to freely contact the upper surface of the supporting member 15 by a downward load applied from the plate spring 10, and the end portion 10c of the plate spring 10 is placed on the supporting member 16 from above to freely contact the upper surface of the supporting member 16 by a downward load applied from the plate spring 10.

By this configuration, the load from the carbody 20 is transmitted to the middle portions of the plate springs 10 through the pressing members 17 provided at the respective lower portions of the car width direction end portions of the cross beam 3a. Further, when a height difference between the front and rear wheels 6 and 7 is generated by, for example, irregularities of a railway track, the plate spring 10 rotates relative to the pressing member 17 like a seesaw to prevent a decrease of a wheel load. As above, while the bogie is traveling, loads are repeatedly applied to the plate springs 10.

An intermediate portion 10d that is an intermediate region between the middle portion 10a and the end portion 10b in the plate spring 10 and an intermediate portion 10e that is an intermediate region between the middle portion 10a and the end portion 10c in the plate spring 10 are separated from other members and arranged in a free state in the air. To be specific, deformation and displacement of the intermediate portions 10d are 10e are not restricted. Therefore, according to the plate spring 10, the intermediate portions 10d and 10e elastically deform using the middle portion 10a and the end portions 10b and 10c as fulcrums. In a side view, the intermediate portions 10d and 10e of the plate spring 10 are inclined downward toward the middle portion 10a, and the middle portion 10a of the plate spring 10 is located lower than the end portions 10b and 10c of the plate spring 10. To be specific, in a side view, the plate spring 10 is formed in a bow shape that is convex downward as a whole. The plate spring 10 has such a shape that the thickness thereof gradually decreases from the middle portion 10a toward each of the end portions 10b and 10c. Hereinafter, for convenience of explanation, a leftward direction in FIG. 1 is defined as a traveling direction. The wheel 6 is referred to as a front wheel, and the wheel 7 is referred to as a rear wheel.

Each of electrode pairs $E_0$, $E_{1F}$, $E_{2F}$, $E_{1R}$, and $E_{2R}$ is provided on both width direction side end surfaces 10f of the plate spring 10, a width direction being perpendicular to the longitudinal direction and thickness direction of the plate spring 10. Each of the electrode pairs $E_0$, $E_{1F}$, $E_{2F}$, $E_{1R}$, and $E_{2R}$ sandwiches the plate spring 10 in the width direction. When viewed from the middle portion 10a of the plate spring 10, the electrode pairs $E_0$, $E_{1F}$, and $E_{2F}$ are arranged close to the front wheel 6, and the electrode pairs $E_{1R}$ and $E_{2R}$ are arranged close to the rear wheel 7. A controller 19 electrically connected to the electrode pairs $E_0$, $E_{1F}$, $E_{2F}$, $E_{1R}$, and $E_{2R}$ through electric wires is mounted on the bogie frame 3. The state monitoring device 30 includes the plate springs 10, the electrode pairs $E_0$, $E_{1F}$, $E_{2F}$, $E_{1R}$, and $E_{2R}$, and the controller 19. It should be noted that a set of the electrode pairs $E_{1F}$ and $E_{2F}$ and a set of the electrode pairs $E_{1R}$ and $E_{2R}$ are arranged symmetrically with respect to a longitudinal direction center of the plate spring 10. Therefore, the following will mainly explain the electrode pairs $E_0$, $E_{1F}$, and $E_{2F}$ located close to the front wheel 6.

Figure 2:
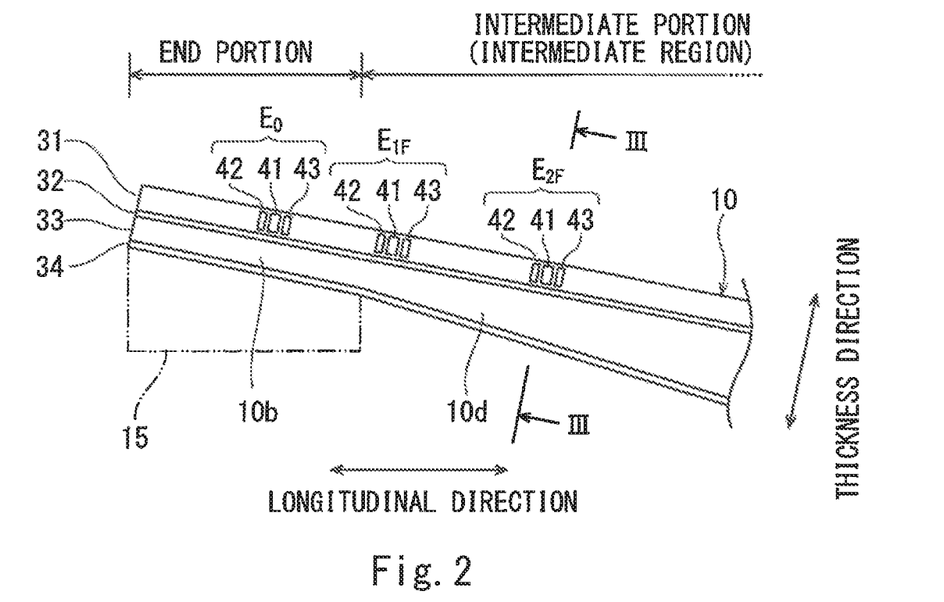
FIG. 2 is an enlarged side view of major components of the plate spring shown in FIG. 1.
Figure 3:
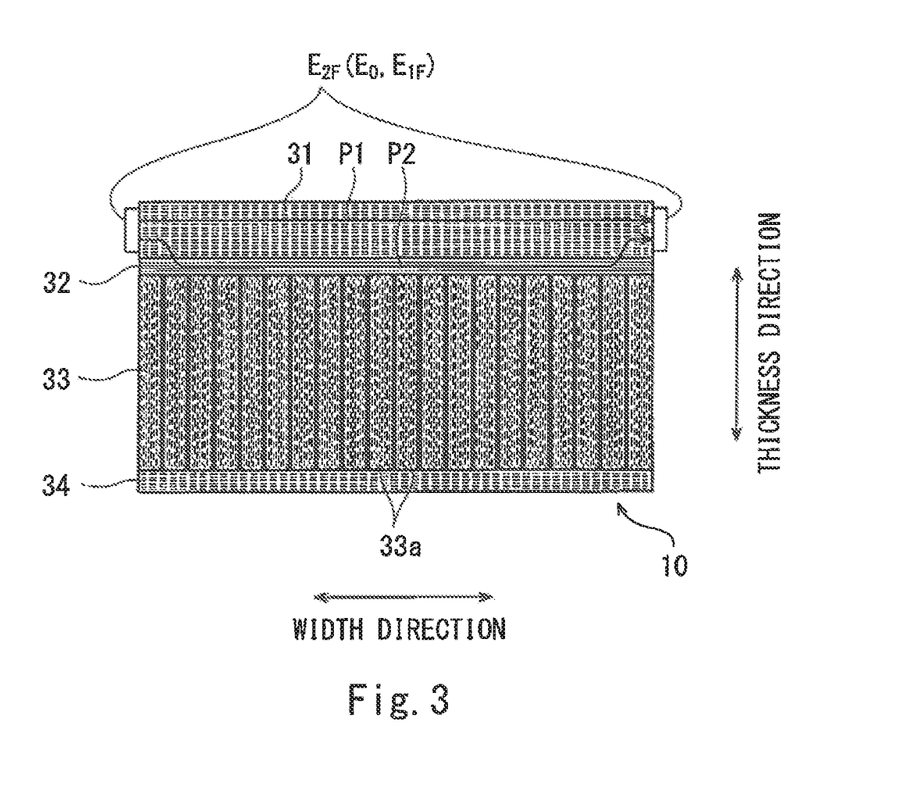
FIG. 3 is a sectional view taken along line of FIG. 2.
Figure 4:
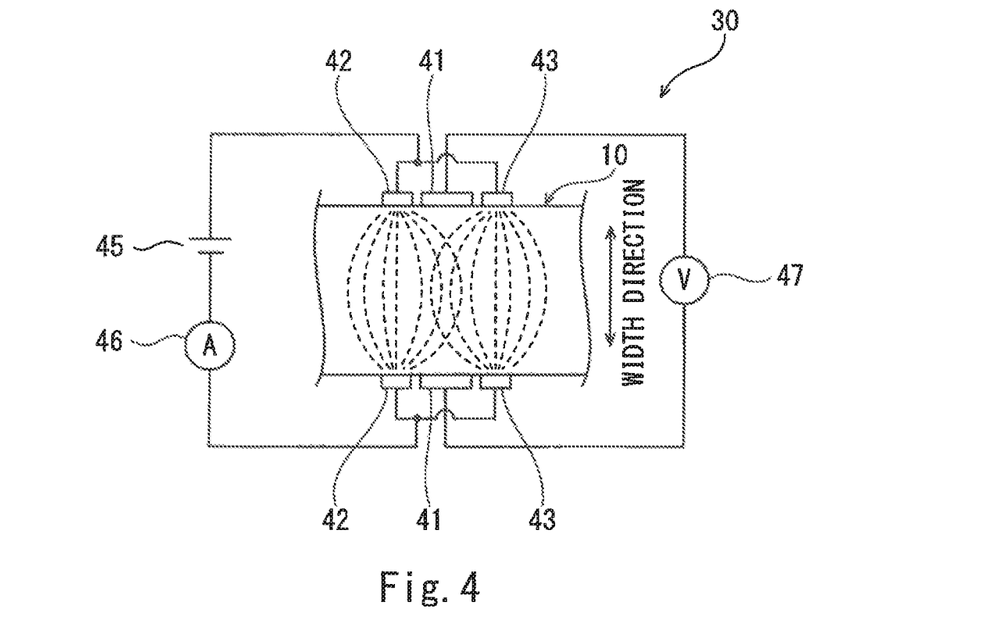
FIG. 4 is a conceptual diagram for explaining a principle of monitoring a state of the plate spring shown in FIG. 2.

FIG. 2 is an enlarged side view of major components of the plate spring 10 shown in FIG. 1. FIG. 3 is a sectional view taken along line of FIG. 2. FIG. 4 is a conceptual diagram for explaining a principle of monitoring the state of the plate spring 10 shown in FIG. 2. As shown in FIGS. 2 and 3, the plate spring 10 is formed by laminating a plurality of fiber-reinforced resin layers and is molded by using a typical composite material molding technique, such as autoclave molding. In the present embodiment, the plate spring 10 includes a first fiber-reinforced resin layer 31, a second fiber-reinforced resin layer 32, a third fiber-reinforced resin layer 33, and a fourth fiber-reinforced resin layer 34. The first fiber-reinforced resin layer 31, the second fiber-reinforced resin layer 32, the third fiber-reinforced resin layer 33, and the fourth fiber-reinforced resin layer 34 are provided in this order from an upper side to a lower side. The third fiber-reinforced resin layer 33 is formed such that the thickness thereof gradually decreases from a longitudinal direction middle portion thereof to each of end portions thereof. The thickness of the first fiber-reinforced resin layer 31, the thickness of the second fiber-reinforced resin layer 32, and the thickness of the fourth fiber-reinforced resin layer 34 are constant.

The first fiber-reinforced resin layer 31, the second fiber-reinforced resin layer 32, and the fourth fiber-reinforced resin layer 34 contain reinforced fibers having electrical conductivity. Specifically, the first fiber-reinforced resin layer 31, the second fiber-reinforced resin layer 32, and the fourth fiber-reinforced resin layer 34 are formed by CFRP containing continuous carbon fibers. The first fiber-reinforced resin layer 31 and the fourth fiber-reinforced resin layer 34 contain continuous fibers continuously extending from one longitudinal direction end of the plate spring 10 to the other longitudinal direction end of the plate spring 10 when viewed from a normal direction of a main surface (an upper surface or a lower surface) of the plate spring 10. Specifically, each of the first fiber-reinforced resin layer 31 and the fourth fiber-reinforced resin layer 34 mainly includes a unidirectional material as a laminate component, the unidirectional material being a material in which carbon fibers are oriented in one direction along the longitudinal direction of the plate spring 10.

The second fiber-reinforced resin layer 32 includes a material containing carbon fibers that are continuous from one width direction end of the plate spring 10 to the other width direction end of the plate spring 10 when viewed from the normal direction of the main surface (the upper surface or the lower surface) of the plate spring 10. Specifically, the second fiber-reinforced resin layer 32 mainly includes, for example, a unidirectional material or a textile material as a laminate component, the unidirectional material being a material in which carbon fibers are oriented in one direction along the width direction of the plate spring 10, the textile material being a material in which carbon fibers are oriented in lengthwise and crosswise directions.

The third fiber-reinforced resin layer 33 is formed by FRP containing electrically nonconductive reinforced fibers. Specifically, the third fiber-reinforced resin layer 33 is formed by GFRP containing glass fibers.

As described above, the first fiber-reinforced resin layer 31, the second fiber-reinforced resin layer 32, and the fourth fiber-reinforced resin layer 34 contain the electrically conductive reinforced fibers, and the third fiber-reinforced resin layer 33 does not contain the electrically conductive reinforced fibers but contains the electrically nonconductive reinforced fibers. To be specific, a boundary between layers containing electrically conductive reinforced fibers is a boundary between the first fiber-reinforced resin layer 31 and the second fiber-reinforced resin layer 32. Each of the electrode pairs $E_0$, $E_{1F}$, and $E_{2F}$ is directly attached to both width direction side end surfaces of the first fiber-reinforced resin layer 31. Specifically, the electrode pairs $E_0$, $E_{1F}$, and $E_{2F}$ are formed in such a manner that electrically conductive ink is applied by screen printing to both width direction side end surfaces of the first fiber-reinforced resin layer 31. In the present embodiment, the electrode pairs $E_0$, $E_{1F}$, and $E_{2F}$ are located away from the second fiber-reinforced resin layer 32.

As electrically conductive paths of current flowing through each of the electrode pairs $E_0$, $E_{1F}$, and $E_{2F}$, there are a first electrically conductive path P1 and a second electrically conductive path P2 as schematically shown by arrows in FIG. 3. The first electrically conductive path P1 is formed only by the carbon fibers of the first fiber-reinforced resin layer 31, and the second electrically conductive path P2 is formed so as to extend through both the carbon fibers of the first fiber-reinforced resin layer 31 and the carbon fibers of the second fiber-reinforced resin layer 32. The first fiber-reinforced resin layer 31 is the unidirectional material and hardly contains continuous fibers continuously extending from one width direction end to the other width direction end. Therefore, the first electrically conductive path P1 is formed in such a manner that a large number of carbon fibers of the first fiber-reinforced resin layer 31 are provided adjacent to one another and contact one another. On this account, the first electrically conductive path P1 has an irregular route extending in the longitudinal direction and width direction of the plate spring 10.

The second electrically conductive path P2 is formed by the carbon fibers of one width direction end portion of the first fiber-reinforced resin layer 31, the carbon fibers of the second fiber-reinforced resin layer 32, and the carbon fibers of the other width direction end portion of the first fiber-reinforced resin layer 31. To be specific, the second electrically conductive path P2 extends through the boundary between the first fiber-reinforced resin layer 31 and the second fiber-reinforced resin layer 32 by the contact between the carbon fibers of the first fiber-reinforced resin layer 31 and the carbon fibers of the second fiber-reinforced resin layer 32. The carbon fibers of the second fiber-reinforced resin layer 32 contains continuous fibers continuously extending from one width direction end of the plate spring 10 to the other width direction end of the plate spring 10. Therefore, the current can flow in the width direction of the plate spring 10 through the electrically conductive path of the second fiber-reinforced resin layer 32 which path is shorter than the electrically conductive path of the first fiber-reinforced resin layer 31. On this account, electrical resistance of the second fiber-reinforced resin layer 32 to the current flowing in the width direction is smaller than electrical resistance of the first fiber-reinforced resin layer 31 to the current flowing in the width direction. Thus, when the current flows through each of the electrode pairs $E_0$, $E_{1F}$, and $E_{2F}$, the current flowing through the second electrically conductive path is larger than the current flowing through the first electrically conductive path.

As above, the second electrically conductive path P2 through which a large amount of current flows extends through the boundary between the first fiber-reinforced resin layer 31 and the second fiber-reinforced resin layer 32. Therefore, if the delamination occurs between the first fiber-reinforced resin layer 31 and the second fiber-reinforced resin layer 32, a sectional area of the second electrically conductive path P2 decreases, so that the electrical resistance of the second electrically conductive path P2 significantly changes. On this account, when a resistance value of the plate spring 10 which value is obtained by supplying the current to each of the electrode pairs $E_0$, $E_{1F}$, and $E_{2F}$ significantly increases, it can be determined that the delamination has occurred.

Further, regarding the first electrically conductive path P1, if the delamination occurs in the first fiber-reinforced resin layer 31, that is, the adjacent fibers contacting each other in the first fiber-reinforced resin layer 31 are separated from each other, a sectional area of the first electrically conductive path P1 decreases, so that the electrical resistance of the first electrically conductive path P1 changes. On this account, this delamination can also be detected by monitoring the increase in the resistance value of the plate spring 10, the resistance value being obtained by supplying the current to each of the electrode pairs $E_0$, $E_{1F}$, and $E_{2F}$.

The electrode pair $E_{1F}$ for monitoring a shearing stress concentrating portion and the electrode pair $E_{2F}$ for monitoring a bending stress concentrating portion are provided at the intermediate portion 10d of the plate spring 10. Each of the electrode pairs $E_{1F}$ and $E_{2F}$ is provided at a position of the intermediate portion 10d of the plate spring 10, the position being closer to the end portion 10b than to the middle portion 10a. Specifically, the electrode pair $E_{1F}$ for monitoring the shearing stress concentrating portion is provided in the vicinity of a boundary between the end portion 10b of the plate spring 10 and the intermediate portion 10d of the plate spring 10. The electrode pair $E_{2F}$ for monitoring the bending stress concentrating portion is provided closer to the middle portion 10a than the electrode pair $E_{1F}$ for monitoring the shearing stress concentrating portion is. The electrode pair $E_0$ for reference in below-described temperature correction is provided at the end portion 10b supported by the supporting member 15 from below. Each of the electrode pairs $E_0$, $E_{1F}$, and $E_{2F}$ is constituted by: a middle electrode element pair 41 for voltage measurement; and side electrode element pairs 42 and 43 for power supply, the pairs 42 and 43 being arranged at both respective sides of the middle electrode element pair 41 in the longitudinal direction of the plate spring 10. Each of the electrode element pairs 41 to 43 is formed in such a shape as to extend in a thickness direction of the first fiber-reinforced resin layer 31.

As shown in FIG. 4, the side electrode element pairs 42 and 43 are short-circuited to each other and connected to a circuit including a power supply 45 and a current sensor 46. The power supply 45 supplies constant current I to the side electrode element pairs 42 and 43. The middle electrode element pair 41 is connected to a circuit including a voltage sensor 47. To be specific, the voltage sensor 47 detects a voltage of the middle electrode element pair 41. The state monitoring device 30 includes: the power supply 45 configured to supply the constant current to the side electrode element pairs 42 and 43; and the voltage sensor 47 configured to detect the voltage of the middle electrode element pair 41. In the plate spring 10 made of fiber-reinforced resin, distribution (shown by broken lines in FIG. 4) of the current supplied to each of the side electrode element pairs 42 and 43 spreads to some extent in the longitudinal direction of the plate spring 10. Therefore, a large amount of current flows through a region between the side electrode element pairs 42 and 43 in the longitudinal direction of the plate spring 10, so that the current concentrates on a portion of the plate spring 10, the portion being sandwiched by the middle electrode element pair 41.

Figure 5:
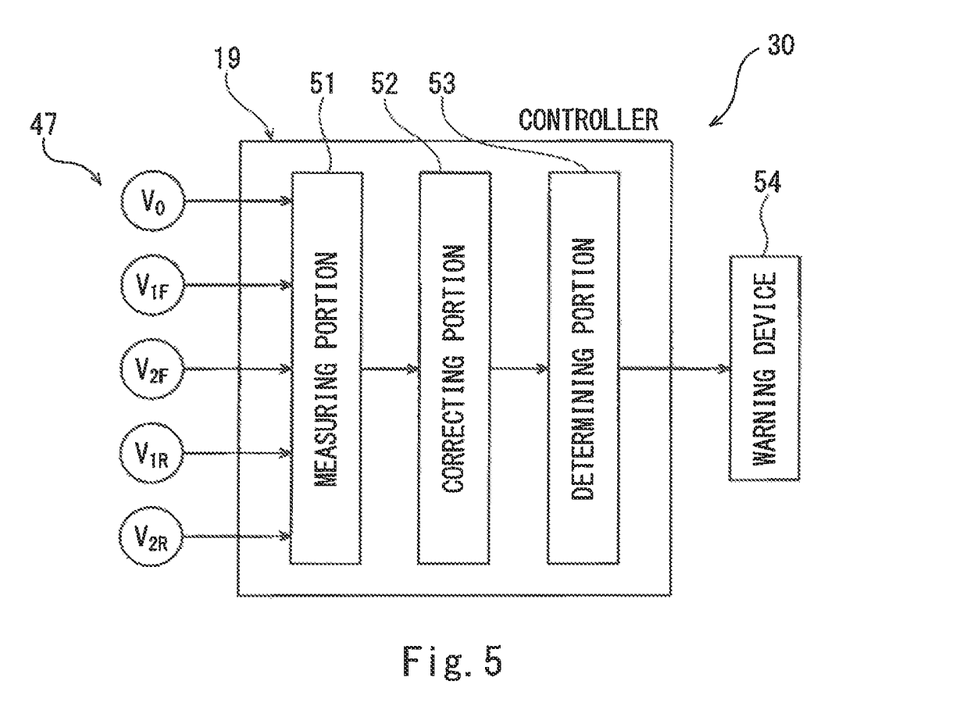
FIG. 5 is a block diagram of the state monitoring device for the plate spring shown in FIG. 1.

FIG. 5 is a block diagram of the state monitoring device 30 for the plate spring 10 shown in FIG. 1. As shown in FIG. 5, the voltage sensors 47 configured to detect the voltages of the electrode pairs $E_0$, $E_{1F}$, $E_{2F}$, $E_{1R}$, and $E_{2R}$ are connected to the controller 19 of the state monitoring device 30. Signals $V_0$, $V_{1F}$, $V_{2F}$, $V_{1R}$, and $V_{2R}$ shown in the respective voltage sensors 47 in FIG. 5 denote respective voltage values detected by the respective electrode pairs $E_0$, $E_{1F}$, $E_{2F}$, $E_{1R}$, and $E_{2R}$. The controller 19 includes a measuring portion 51, a correcting portion 52, and a determining portion 53. The measuring portion 51 measures resistance values R as values of an electrical characteristic of the plate spring 10 based on the signals from the voltage sensors 47. Specifically, since the current I supplied to the electrode pair ($E_0$, $E_{1F}$, $E_{2F}$, $E_{1R}$, $E_{2R}$) is constant, the measuring portion 51 divides a voltage value ($V_0$, $V_{1F}$, $V_{2F}$, $V_{1R}$, $V_{2R}$), detected by the voltage sensor 47, by the constant current I to obtain a resistance value ($R_0$, $R_{1F}$, $R_{2F}$, $R_{1R}$, $R_{2R}$) of a portion sandwiched by the electrode pair ($E_0$, $E_{1F}$, $E_{2F}$, $E_{1R}$, $E_{2R}$).

The correcting portion 52 performs such correction that a component by a track disturbance and a component by a temperature change are removed from the resistance value ($R_{1F}$, $R_{2F}$, $R_{1R}$, $R_{2R}$) measured by the measuring portion 51 based on the signal from the electrode pair ($E_{1F}$, $E_{1R}$, $E_{2F}$, and $E_{2R}$). Details of the correction will be described later. The determining portion 53 determines whether or not the resistance value ($R_{1F}$, $R_{2F}$, $R_{1R}$, $R_{2R}$) corrected by the correcting portion 52 has exceeded a predetermined threshold Rth. At this time, the determining portion 53 performs known smoothing (moving average, for example) with respect to the resistance value ($R_{1F}$, $R_{2F}$, $R_{1R}$, $R_{2R}$) for noise removal. When the resistance value ($R_{1F}$, $R_{2F}$, $R_{1R}$, $R_{2R}$) has not exceeded the predetermined threshold Rth, the determining portion 53 does not transmit a signal to a warning device 54. When the resistance value ($R_{1F}$, $R_{2F}$, $R_{1R}$, $R_{2R}$) has exceeded the predetermined threshold Rth, the determining portion 53 transmits the signal to the warning device 54. When the warning device 54 receives the signal, the warning device 54 warns by at least one of warning display and warning sound. It should be noted that the warning device 54 is provided at a driver's cab of the railcar but may be provided at the bogie 1.

Figure 6:
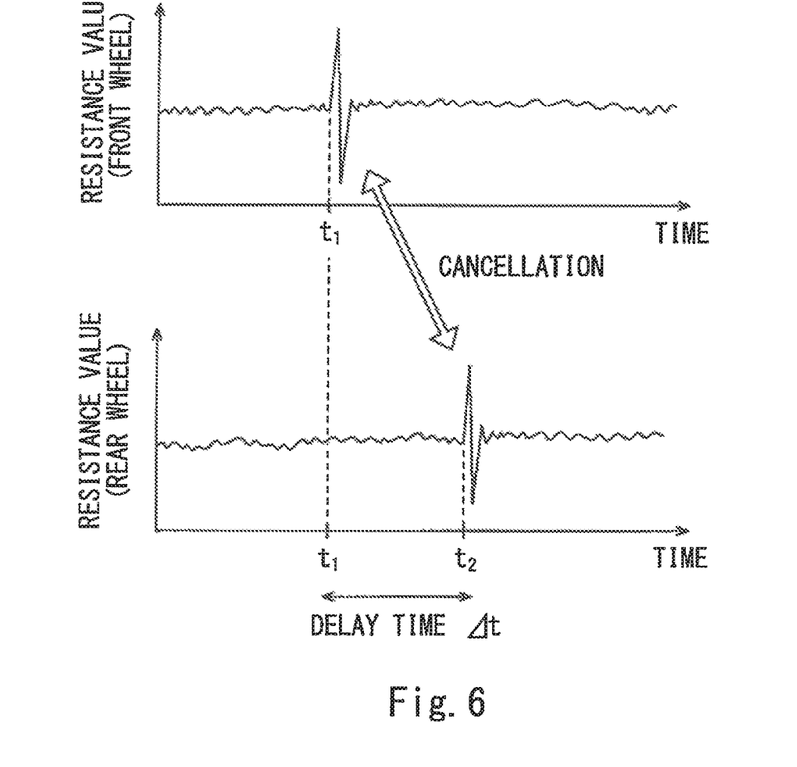
FIG. 6 is a diagram for explaining a relation between a graph showing time-series data of a resistance value obtained from an electrode pair provided close to a front wheel shown in FIG. 1 and a graph showing time-series data of a resistance value obtained from an electrode pair provided close to a rear wheel shown in FIG. 1.

FIG. 6 is a diagram for explaining a relation between a graph showing time-series data of the resistance value obtained from the electrode pair $E_{1F}$ (first electrode pair) located close to the front wheel 6 shown in FIG. 1 and a graph showing time-series data of the resistance value obtained from the electrode pair $E_{1R}$ (second electrode pair) located close to the rear wheel 7 shown in FIG. 1. As shown in FIG. 6, when a shock (for example, a shock generated when the bogie travels through a turnout) is transmitted from a track to the bogie 1 during traveling, load fluctuation occurs at the plate spring 10, and pulsed piezo resistance fluctuation is generated as the track disturbance in the resistance value obtained from each of the electrode pairs $E_{1F}$ and $E_{1R}$. At this time, the shock from the track is first input to the front wheel 6 and then input to the rear wheel 7. Therefore, a time $t_2$ at which the pulsed piezo resistance fluctuation is generated in the resistance value obtained from the electrode pair $E_{1R}$ located close to the rear wheel 7 is delayed from a time $t_1$ at which the pulsed piezo resistance fluctuation is generated in the resistance value obtained from the electrode pair $E_{1F}$ located close to the front wheel 6. A delay time $\Delta t$ ($=t_2-t_1$) is a time obtained by dividing a distance between a center of the front wheel 6 and a center of the rear wheel 7 by a traveling speed of the railcar.

The correcting portion 52 corrects the time-series data of the resistance value obtained from the electrode pair $E_{1F}$ located close to the front wheel 6 in such a manner as to: offset a time axis of the time-series data of the resistance value, obtained from the electrode pair $E_{1R}$ located close to the rear wheel 7, so as to advance the time axis by the delay time $\Delta t$; and subtract the time-series data of the resistance value obtained from the electrode pair $E_{1R}$ located close to the rear wheel 7 from the time-series data of the resistance value obtained from the electrode pair $E_{1F}$ located close to the front wheel 6. With this, a piezo resistance fluctuation component generated by the track disturbance is removed by cancellation from the time-series data of the resistance value obtained from the electrode pair $E_{1F}$ located close to the front wheel 6.

Further, when correcting the time-series data of the resistance value obtained from the electrode pair $E_{1R}$ located close to the rear wheel 7, the correcting portion 52 may perform such correction as to: offset the time axis of the time-series data of the resistance value, obtained from the electrode pair E1F located close to the front wheel 6, so as to delay the time axis by the delay time $\Delta t$; and subtract the time-series data of the resistance value obtained from the electrode pair $E_{1F}$ located close to the front wheel 6 from the time-series data of the resistance value obtained from the electrode pair $E_{1R}$ located close to the rear wheel 7. It should be noted that even when removing the track disturbance from the resistance value obtained from each of the electrode pairs $E_{2F}$ and $E_{2R}$, the same correction as above is only required.

Further, the electrical resistance of the plate spring 10 fluctuates also by the temperature change of the plate spring 10 itself. Therefore, as described below, the correcting portion 52 performs such correction as to remove a resistance fluctuation component, generated by the temperature change, from the resistance value obtained from the electrode pair ($E_{1F}$, $E_{1R}$, $E_{2F}$, $E_{2R}$; main electrode pair) using as a reference value the resistance value obtained from the electrode pair $E_0$ (sub electrode pair). Stress generated by the elastic deformation of the plate spring 10 at a portion of the plate spring 10 at which portion the electrode pair $E_0$ for reference is provided is smaller than stress generated by the elastic deformation of the plate spring 10 at a portion of the plate spring 10 at which portion the electrode pair ($E_{1F}$, $E_{1R}$, $E_{2F}$, $E_{2R}$) for monitoring is provided. In the present embodiment, since the end portion 10b at which the electrode pair $E_0$ for reference is provided is supported by the supporting member 15, the piezo resistance fluctuation by the load fluctuation is hardly generated.

The correcting portion 52 corrects the resistance value obtained from the electrode pair ($E_{1F}$, $E_{1R}$, $E_{2F}$, $E_{2R}$) for monitoring in such a manner as to subtract the resistance value obtained from the electrode pair $E_0$ for reference from the resistance value obtained from the electrode pair ($E_{1F}$, $E_{1R}$, $E_{2F}$, $E_{2R}$) for monitoring. With this, the resistance fluctuation component generated by the temperature change is removed from the resistance value obtained from the electrode pair ($E_{1F}$, $E_{1R}$, $E_{2F}$, $E_{2R}$) for monitoring.

Figure 7:
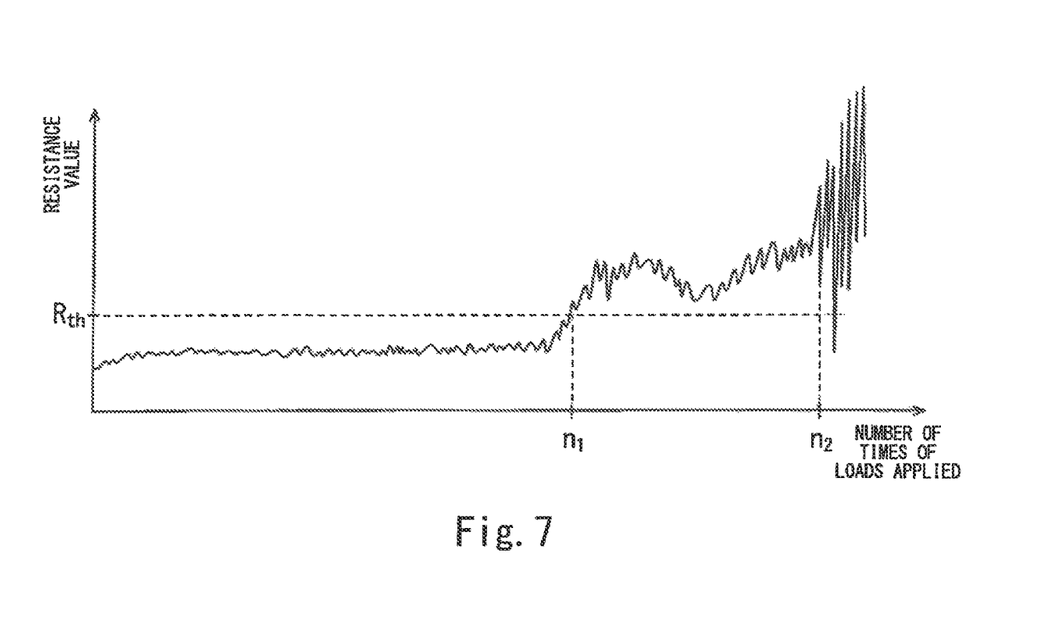
FIG. 7 is a graph showing a relation between a resistance value of a test piece and the number of times of loads applied, the resistance value being measured in a fatigue test of the test piece, the test piece having the same structure as the plate spring shown in FIG. 1.

FIG. 7 is a graph showing a relation between a resistance value of a test piece and the number of times of loads applied, the resistance value being measured in a fatigue test of the test piece, the test piece having the same structure as the plate spring shown in FIG. 1. In the graph of FIG. 7, a horizontal axis denotes the number of times of loads repeatedly applied to the test piece, and a vertical axis denotes the measured resistance value of the test piece. According to this graph, before the number of times of loads applied becomes large, the resistance value is smaller than a predetermined threshold Rth, and the fluctuation of the resistance value is small. When the number of times of loads applied reaches $n_1$, the resistance value increases to exceed the threshold Rth, and the fluctuation of the resistance value also increases. At this time, it is thought that, for example, small delamination is being generated in the test piece. However, according to observation by ultrasound flaw detection performed simultaneously, the generation of the delamination is not visually confirmed. When the number of times of loads applied reaches $n_2$, the resistance value further increases, and the fluctuation of the resistance value also further increases. At this time, according to the observation by the ultrasound flaw detection performed simultaneously, the generation of the delamination is confirmed. To be specific, the state monitoring using the resistance value can detect at an early stage a state change that is not detectable by the ultrasound flaw detection, so that a sign of the break of the plate spring is suitably detected.

According to the configuration explained above, since each of the electrode pairs $E_0$, $E_{1F}$, $E_{1R}$, $E_{2F}$, and $E_{2R}$ is provided on both width direction side end surfaces 10f of the plate spring 10, the break and delamination generated even at a portion of the plate spring 10 which portion is away from the main surface (the upper surface or the lower surface) of the plate spring 10 in the thickness direction can be detected highly accurately. Further, in the configuration in which the carbon fibers extend in the longitudinal direction of the plate spring 10, the current flows through the electrically conductive path, formed by the contact of the adjacent fibers, at the electrode pair ($E_0$, $E_{1F}$, $E_{1R}$, $E_{2F}$, $E_{2R}$) provided at the width direction side end surfaces 10f of the plate spring 10. Therefore, the delamination that is the separation of the adjacent fibers can be detected highly accurately. Further, a state change portion of the plate spring 10 in the longitudinal direction can be specified more easily than a case where the electrode pair is provided on longitudinal direction end surfaces of the plate spring 10. Furthermore, a distance from the neutral axis of the plate spring 10 to the electrode pair ($E_0$, $E_{1F}$, $E_{1R}$, $E_{2F}$, $E_{2R}$) in the thickness direction is shorter than that in a case where the electrode pair is arranged on one of main surfaces of the plate spring 10. Therefore, distortion of the electrode pairs $E_0$, $E_{1F}$, $E_{1R}$, $E_{2F}$, and $E_{2R}$ by the compression or tension generated by bending of the plate spring 10 decreases, and the electrode pairs $E_0$, $E_{1F}$, $E_{1R}$, $E_{2F}$, and $E_{2R}$ are prevented from being damaged. As above, in the plate spring 10 mounted on the railcar bogie 1 and made of fiber-reinforced resin, the state change portion can be easily specified, the damage of the electrode can be prevented, and the detection accuracy of the delamination can be improved.

Further, since the electrode pair ($E_0$, $E_{1F}$, $E_{1R}$, $E_{2F}$, $E_{2R}$) are provided on the side end surfaces of the first fiber-reinforced resin layer 31, and the electrical resistance of the second fiber-reinforced resin layer 32 in the width direction is smaller than the electrical resistance of the first fiber-reinforced resin layer 31 in the width direction, the current by the electrode pair ($E_0$, $E_F$, $E_{1R}$, $E_{2F}$, $E_{2R}$) flows through the first fiber-reinforced resin layer 31 to the second fiber-reinforced resin layer 32. To be specific, the electrically conductive path of the current flowing through the electrode pair ($E_0$, $E_{1F}$, $E_{1R}$, $E_{2F}$, and $E_{2R}$) extends through the boundary between the first fiber-reinforced resin layer 31 and the second fiber-reinforced resin layer 32, so that when interlayer delamination occurs, the change in the resistance value of the plate spring 10 measured by the measuring portion 51 can be made significant. Therefore, the interlayer delamination in the plate spring 10 can be detected highly accurately. Further, since the determining unit 53 determines whether or not the resistance value measured by the measuring portion 51 has exceeded the threshold Rth, the sign of the abnormality of the plate spring 10 can be easily recognized by threshold determination.

Each of the electrode pairs $E_0$, $E_{1F}$, $E_{1R}$, $E_{2F}$, and $E_{2R}$ includes the middle electrode element pair 41 for voltage measurement and the side electrode element pairs 42 and 43 which are arranged at both respective sides of the middle electrode element pair 41 and to which the constant current is supplied. The measuring unit 51 measures of the resistance value of the corresponding portion of the plate spring 10 based on the voltage of the middle electrode element pair 41. Therefore, the state change of the plate spring 10 can be detected highly sensitively. Specifically, in the plate spring 10 made of fiber-reinforced resin, the distribution of the current supplied to each of the side electrode element pairs 42 and 43 spreads to some extent in the longitudinal direction of the plate spring 10. Therefore, a large amount of current flows through a region between the side electrode element pairs 42 and 43 in the longitudinal direction of the plate spring 10, so that the current concentrates on a portion of the plate spring 10, the portion being sandwiched by the middle electrode element pair 41. Therefore, when a resistance change is generated at the portion of the plate spring 10 which portion is sandwiched by the middle electrode element pair 41, a large voltage change occurs. Thus, the state change of the plate spring 10 can be detected highly sensitively.

Each of the electrode pairs $E_{1F}$, $E_{1R}$, $E_{2F}$, and $E_{2R}$ for monitoring is provided at the intermediate portion 10d or 10e of the plate spring 10, the intermediate portion 10d being provided between the middle portion 10a and the end portion 10b, the intermediate portion 10e being provided between the middle portion 10a and the end portion 10c. To be specific, each of the electrode pairs $E_{1F}$, $E_{1R}$, $E_{2F}$, and $E_{2R}$ is provided at a potion on which the stress of the plate spring 10 tends to act. Therefore, the state change of the plate spring 10 can be detected quickly. Further, in the plate spring 10 having such a shape that the thickness thereof decreases from the middle portion 10a toward the end portions 10b and 10c, the electrode pair $E_{1F}$ for monitoring is provided at a position of the intermediate portion 10d which position is closer to the end portion 10b than to the middle portion 10a, and the electrode pair $E_{1R}$ for monitoring is provided at a position of the intermediate portion 10e which position is closer to the end portion 10c than to the middle portion 10a. In addition, the state change of the plate spring 10 by the shearing stress tends to start at a portion of the plate spring 10 which portion is thin and is not supported. Therefore, the state change of the plate spring 10 by the shearing stress can be detected quickly.

The electrode pairs $E_0$, $E_{1F}$, $E_{1R}$, $E_{2F}$, and $E_{2R}$ are formed by the electrically conductive ink, and the electrically conductive ink itself has elasticity. Therefore, the damages of the electrode pairs $E_0$, $E_{1F}$, $E_{1R}$, $E_{2F}$, and $E_{2R}$ due to the distortion of the electrode pairs $E_0$, $E_{1F}$, $E_{1R}$ $E_{2F}$, and $E_{2R}$ by the bending motion of the plate spring 10 can be prevented.

The present invention is not limited to the above embodiment, and modifications, additions, and eliminations may be made within the scope of the present invention. For example, each of the electrode pairs $E_0$, $E_{1F}$, $E_{1R}$, $E_{2F}$, and $E_{2R}$ may not be separated from the second fiber-reinforced resin layer 32 and may be provided on both the side end surfaces of the first fiber-reinforced resin layer 31 and the side end surfaces of the second fiber-reinforced resin layer 32. In the above embodiment, the measuring portion 51 measures the resistance value as the value of the electrical characteristic. However, the voltage value may be measured instead of the resistance value. The electrode pair $E_0$ for reference is provided at the end portion 10b of the plate spring 10. However, the electrode pair $E_0$ may be provided at the end portion 10c or the middle portion 10a.

REFERENCE SIGNS LIST $E_0$ electrode pair for reference
$E_{1F}$ $E_{2F}$, $E_{1R}$, $E_{2R}$ electrode pair for monitoring
1 bogie
6, 7 wheel
10 plate spring
10a middle portion
10b, 10c end portion
10d, 10e intermediate portion
10f side end surface
11, 12 axle box
17 pressing member
30 state monitoring device
31 first fiber-reinforced resin layer
32 second fiber-reinforced resin layer
41 middle electrode element pair
42, 43 side electrode element pair
51 measuring portion (measuring unit)
52 correcting portion (correcting unit)
53 determining portion (determining unit)

The invention claimed is:
1. A state monitoring device for a plate spring mounted on a railcar bogie,
the state monitoring device being configured to monitor a state of the plate spring, the plate spring including fiber-reinforced resin containing electrically conductive reinforced fibers containing reinforced fibers extending in a longitudinal direction of the plate spring, the state monitoring device comprising:
- an electrode pair, which is a pair of two separate electrodes, respectively provided at both width direction side end surfaces of the plate spring, wherein the plate spring is sandwiched between the two separate electrodes in a width direction of the plate spring, the width direction of the plate spring being perpendicular to the longitudinal direction of the plate spring and a thickness direction of the plate spring; and
- a measuring unit electrically connected to the electrode pair and configured to measure an electrical characteristic of the plate spring.

2. The state monitoring device according to claim 1, wherein
to detect delamination between a first fiber-reinforced resin layer of the plate spring and a second fiber-reinforced resin layer of the plate spring, the electrode pair is provided at both width direction side end surfaces of the first fiber-reinforced resin layer, electrical resistance of the second fiber-reinforced resin layer to current flowing in the width direction being smaller than electrical resistance of the first fiber-reinforced resin layer to current flowing in the width direction.

3. The state monitoring device according to claim 1, further comprising
a determining unit configured to determine whether or not a value of the electrical characteristic measured by the measuring unit has exceeded a predetermined threshold.

4. The state monitoring device according to claim 1, wherein
the electrode pair is provided at an intermediate region of the plate spring, the intermediate region being located between a middle portion of the plate spring and an end portion of the plate spring in the longitudinal direction of the plate spring, the middle portion being pressed by a car width direction end portion of a cross beam of the bogie from above, the end portion being supported by an axle box of the bogie from below.

5. The state monitoring device according to claim 4, wherein
the electrode pair is provided at a position of the intermediate region of the plate spring, the position being located close to the end portion having a thickness that is relatively smaller than a thickness of the middle portion.

6. The state monitoring device according to claim 1, wherein:
the electrode pair includes
- a middle electrode element pair for voltage measurement and
- side electrode element pairs for power supply, the side electrode element pairs being provided at both respective sides of the middle electrode element pair in the longitudinal direction of the plate spring;

the side electrode element pairs are connected to a power supply configured to supply constant current; and
the measuring unit measures the electrical characteristic of the plate spring based on a voltage of the middle electrode element pair.

7. The state monitoring device according to claim 1, further comprising
a correcting unit configured to correct a value measured by the measuring unit, wherein:
the electrode pair is one of a plurality of electrode pairs including a main electrode pair and a sub electrode pair, the main electrode pair and the sub electrode pair being provided at the plate spring;
stress generated by elastic deformation of the plate spring at a portion at which the sub electrode pair is provided is smaller than stress generated by the elastic deformation of the plate spring at a portion at which the main electrode pair is provided; and
the correcting portion corrects a value of a main electrical characteristic, measured based on current flowing through the main electrode pair, in such a manner as to subtract a value of a sub electrical characteristic measured based on current flowing through the sub electrode pair from the value of the main electrical characteristic.

8. The state monitoring device according to claim 1, further comprising
a correcting unit configured to correct a value measured by the measuring unit, wherein:
the electrode pair is one of a plurality of electrode pairs including a first electrode pair and a second electrode pair, the first electrode pair and the second electrode pair being provided at the plate spring, the plate spring being mounted on the bogie so as to extend in a longitudinal direction of the railcar;
the first electrode pair is arranged close to a front wheel located at a front side in a traveling direction of the bogie, and the second electrode pair is arranged close to a rear wheel located at a rear side in the traveling direction of the bogie; and
the correcting portion corrects a value of a first electrical characteristic, measured based on current flowing through the first electrode pair, in such a manner as to (i) offset a time axis of time-series data of the first electrical characteristic relative to a time axis of time-series data of a second electrical characteristic by a delay time to a delay side, the second electrical characteristic being measured based on current flowing through the second electrode pair, the delay time being obtained by dividing a distance between a center of the front wheel and a center of the rear wheel in a car longitudinal direction by a traveling speed of the railcar and (ii) subtract the time-series data of the second electrical characteristic from the time-series data of the first electrical characteristic, or
the correcting portion corrects a value of the second electrical characteristic in such a manner as to (i) offset the time axis of the time-series data of the first electrical characteristic relative to the time axis of the time-series data of the second electrical characteristic by the delay time to the delay side and (ii) subtract the time-series data of the first electrical characteristic from the time-series data of the second electrical characteristic.

9. The state monitoring device according to claim 1, wherein
the state monitoring device comprises a plurality of electrode pairs, each electrode pair being provided at both width direction side end surfaces of the plate spring to sandwich the plate spring in the width direction.

* * * * *